(12) United States Patent
Lin et al.

(10) Patent No.: US 9,605,512 B2
(45) Date of Patent: Mar. 28, 2017

(54) MINE AREA DISTRIBUTED COMBINED COOLING HEATING POWER ENERGY SYSTEM FOR EXTRACTING GAS FOR COAL MINE

(71) Applicant: CHINA UNIVERSITY OF MINING AND TECHNOLOGY, Xuzhou, Jiangsu (CN)

(72) Inventors: Baiquan Lin, Jiangsu (CN); Qingzhao Li, Jiangsu (CN)

(73) Assignee: China University of Mining and Technology, Xuzhou, Jiangsu (CN)

( * ) Notice: Subject to any disclaimer, the term of this patent is extended or adjusted under 35 U.S.C. 154(b) by 274 days.

(21) Appl. No.: 14/416,004

(22) PCT Filed: Jan. 27, 2014

(86) PCT No.: PCT/CN2014/071560
§ 371 (c)(1),
(2) Date: Jan. 20, 2015

(87) PCT Pub. No.: WO2014/187172
PCT Pub. Date: Nov. 27, 2014

(65) Prior Publication Data
US 2015/0159470 A1    Jun. 11, 2015

(30) Foreign Application Priority Data
May 24, 2013 (CN) .......................... 2013 1 0202102

(51) Int. Cl.
*E21B 36/00* (2006.01)
*E21F 7/00* (2006.01)
(Continued)

(52) U.S. Cl.
CPC ............ *E21B 36/00* (2013.01); *E21B 36/006* (2013.01); *E21B 41/0085* (2013.01);
(Continued)

(58) Field of Classification Search
CPC .... E21B 36/00; E21B 41/0085; E21B 43/122; E21B 36/006; E21F 3/00; E21F 7/00
See application file for complete search history.

(56) References Cited

FOREIGN PATENT DOCUMENTS

| CN | 201547495 U | 8/2010 |
|---|---|---|
| CN | 102562131 A | 7/2012 |

(Continued)

OTHER PUBLICATIONS

PCT International Search Report, PCT/CN2014/071560 dated May 5, 2014.

*Primary Examiner* — Elizabeth Gitlin
(74) *Attorney, Agent, or Firm* — TraskBritt, P.C.

(57) ABSTRACT

A distributed combined cooling, heating and power energy system for gas extraction in a coal mining area, which belongs to an energy system for gas production. A gas extraction pump station, a gas storage tank, a water-sealing flame arrester, a wire mesh filter, a first pipeline flame arrester, a wet-type bleeding valve and a cyclone dehydrator are sequentially connected; an outlet of the cyclone dehydrator is divided into two branches, one branch sequentially connected with a second pipeline flame arrester, a proportioning mixer, a gas power machine, a waste heat boiler and a waste heat-type double-effect lithium bromide absorption water chiller/heater unit, and the other connected with a gas-type double-effect lithium bromide absorption water chiller/heater unit; a first power generator is connected with the gas power machine, a water storage tank outlet is connected with a pressurizing pump, a second power generator is connected with a steam turbine and driven by the steam power machine to generate power, and cold/hot water of the waste heat-type water chiller/heater unit and the gas-type water chiller/heater unit is delivered through an energy supply pipeline after collection and mixing. With the (Continued)

power energy system mining area, clean production and utilization of coal-mine gas and economic development of coal mine areas are realized.

8 Claims, 1 Drawing Sheet

(51) Int. Cl.
 *E21B 41/00* (2006.01)
 *E21B 43/12* (2006.01)
 *E21F 3/00* (2006.01)
(52) U.S. Cl.
 CPC .............. *E21B 43/122* (2013.01); *E21F 3/00* (2013.01); *E21F 7/00* (2013.01)

(56) References Cited

FOREIGN PATENT DOCUMENTS

| | | |
|---|---|---|
| CN | 102424767 B | 6/2013 |
| CN | 103277130 A | 9/2013 |
| CN | 103291351 A | 9/2013 |
| CN | 203271799 U | 11/2013 |
| CN | 203308506 U | 11/2013 |
| RU | 2287056 C1 | 11/2006 |

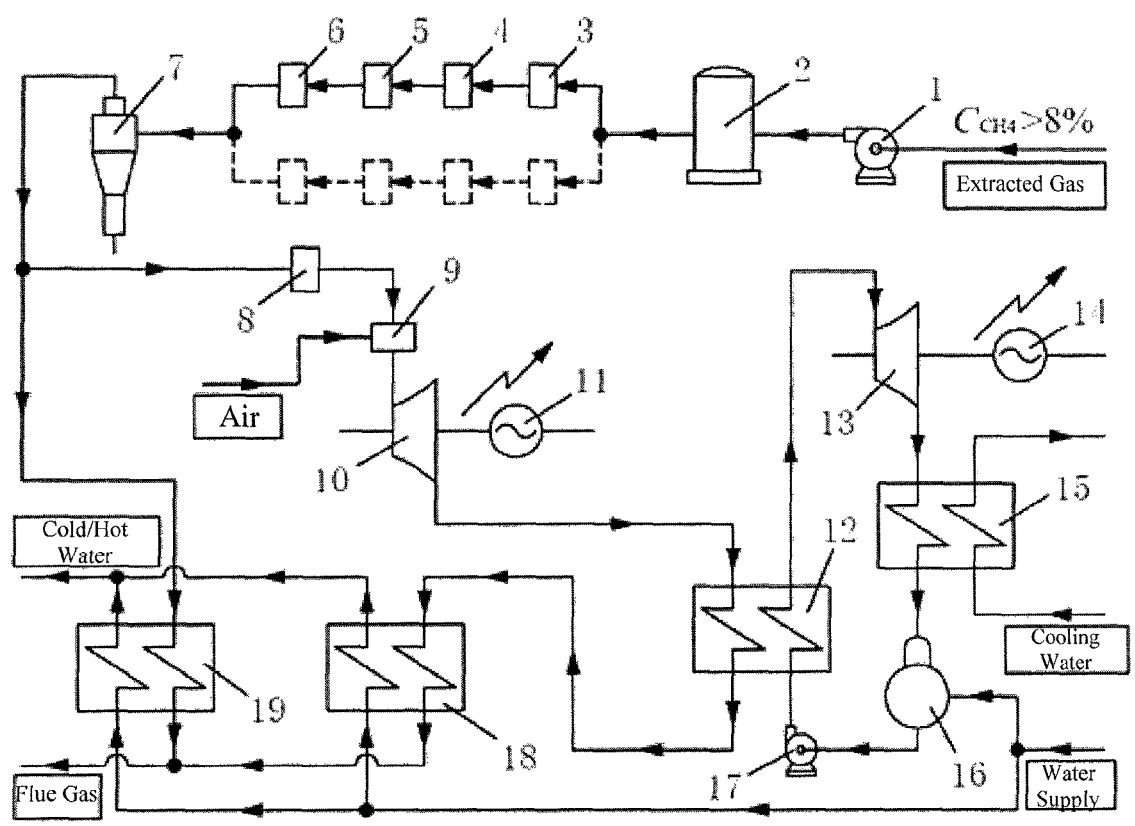

MINE AREA DISTRIBUTED COMBINED COOLING HEATING POWER ENERGY SYSTEM FOR EXTRACTING GAS FOR COAL MINE

CROSS-REFERENCE TO RELATED APPLICATIONS

This application is a national phase entry under 35 U.S.C. §371 of International Patent Application PCT/CN2014/071560, filed Jan. 27, 2014, designating the United States of America and published as International Patent Publication WO 2014/187172 A1 on Nov. 27, 2014, which claims the benefit under Article 8 of the Patent Cooperation Treaty to Chinese Patent Application Serial No. 201310202102.7 2013, filed May 24, 2013.

TECHNICAL FIELD

This disclosure relates to an energy system for gas production, in particular, to a distributed combined cooling, heating and power (CCHP) energy system for gas extraction in coal mining areas.

BACKGROUND

Gas is a companion product of coal, which is a precious non-renewable energy resource. Because the existence of gas is one of the main causes of the frequent accidents in coal mines, gas must be extracted for safe production in coal mines. As the coal mining depth increases, the gas content in the coal seams increases significantly. Therefore, simultaneous extraction of coal and gas is a necessary approach for exploitation of deep coal and gas resources. Strengthening the gas extraction is of great significance for improving the level of safety and efficiency of production in coal mines and reducing the emission of greenhouse gasses.

The distributed energy system is a new energy system. When compared with conventional energy systems, the distributed energy system has a lot of advantages, such as being safe and reliable, high-energy conversion efficiency, and environmentally friendly, etc. Therefore, the distributed energy system has brilliant application prospects, with high practicability and development potential. However, owing to the fluctuation of gas concentration in coal mining areas, there is no distributed CCHP energy system for gas extraction in coal mining areas until now, which is constructed specifically on the basis of the characteristics of gas extraction in coal mining areas.

BRIEF SUMMARY

Provided is a relatively safe and efficient distributed CCHP energy system for gas extraction in coal mining areas.

Technical scheme: The distributed CCHP energy system comprises:

a gas extraction pump station, a gas storage tank, a water-sealing flame arrester, a wire mesh filter, a first pipeline flame arrester, a wet-type bleeding valve, a cyclone dehydrator, a second pipeline flame arrester, a proportioning mixer, a gas power machine, a first power generator, a waste heat boiler, a steam power machine, a second power generator, a condenser, a water storage tank, a pressurizing pump, a waste heat-type double-effect lithium bromide absorption water chiller/heater unit, and a gas-type double-effect lithium bromide absorption water chiller/heater unit;

the gas extraction pump station, the gas storage tank, the water-sealing flame arrester, the wire mesh filter, the first pipeline flame arrester, the wet-type bleeding valve and the cyclone dehydrator are sequentially connected;

the outlet of the cyclone dehydrator is divided into two branches, wherein one branch is sequentially connected with the second pipeline flame arrester, the proportioning mixer, the gas power machine, the waste heat boiler and the waste heat-type double-effect lithium bromide absorption water chiller/heater unit, and the other branch is connected with the gas-type double-effect lithium bromide absorption water chiller/heater unit;

the first power generator is connected with the gas power machine and is driven by the gas power machine to generate power, an outlet of the water storage tank is connected with the pressurizing pump, the working substance (water) is pressurized by the pressurizing pump and flows into the waste heat boiler, the high-pressure steam generated by the waste heat boiler drives the steam power machine, and then the high-pressure steam generated is condensed by the condenser and returns to the water storage tank, the condenser is cooled by cooling water;

the second power generator is connected with the steam power machine and driven by the steam power machine to generate power, and cold/hot water of the waste heat-type double-effect lithium bromide absorption water chiller/heater unit and the gas-type double-effect lithium bromide absorption water chiller/heater unit is delivered through an energy supply pipeline to users after being collected and mixed.

The pipeline section of the water-sealing flame arrester, the wire mesh filter, the first pipeline flame arrester, and the wet-type bleeding valve has parallel branch pipelines in the same configuration.

The gas power machine is a mini-type gas turbine or internal combustion gas engine.

The steam power machine is a steam turbine or steam screw expander.

Beneficial effects: With the technical schemes described above, the gas extraction in coal mines is multi-protected by the water-sealing flame arrester, the wire mesh filter, the first pipeline flame arrester, and the wet-type bleeding valve, and, therefore, the safety of the gas conveying system is greatly improved. First, the extracted gas does work in the gas power machine. Second, the high-temperature flue gas generated during combustion enters into the waste heat boiler and waste heat-type double-effect lithium bromide absorption water chiller/heater unit sequentially for energy exchange. In that way, the energy is utilized in a cascaded manner, and the utilization efficiency of the energy system is improved. The extracted gas in the coal mine is reasonably, effectively, and comprehensively utilized as a resource, especially when a mining area-distributed thermoelectric cooling poly-production energy system is constructed in the coal mining area on the basis of coal extraction, which has great significance for strengthening utilization of extracted gas in coal mines, enhancing production safety in coal mines, and reducing emission of greenhouse gasses.

Advantages: The distributed gas energy system in coal mining areas satisfying CCHP is suitable for resource utilization of gas in coal mines where the gas extraction concentration is ≥8%, especially when a distributed gas extraction CCHP energy system can be constructed for coal mining areas on the basis of the characteristics of gas extraction concentration in such mining areas to meet the requirements for safety and reliability. In addition, such a system can achieve waste heat cascaded utilization; therefore, the energy utilization efficiency is high. The conversion from coal-mine gas to clean energy can be accomplished while the emission of greenhouse gasses and methane is reduced; thus, clean production and utilization of coal-mine gas and circular economy development in coal mining areas can be implemented.

BRIEF DESCRIPTION OF THE DRAWINGS

FIG. 1 is a structural diagram of a distributed CCHP energy system for gas extraction in coal mining areas in the disclosure.

Key to reference numerals in FIG. 1:
1—gas extraction pump station;
2—gas storage tank;
3—water-sealing flame arrester;
4—wire mesh filter;
5—first pipeline flame arrester;
6—wet-type bleeding valve;
7—cyclone dehydrator;
8—second pipeline flame arrester;
9—proportioning mixer;
10—gas power machine;
11—first power generator;
12—waste heat boiler;
13—steam power machine;
14—second power generator;
15—condenser;
16—water storage tank;
17—pressurizing pump;
18—waste heat-type double-effect lithium bromide absorption water chiller/heater unit;
19—gas-type double-effect lithium bromide absorption water chiller/heater unit.

DETAILED DESCRIPTION

Hereinafter, the disclosure will be further detailed in an embodiment, with reference to the accompanying drawing:

Embodiment 1

The combined energy system comprises:
a gas extraction pump station 1, a gas storage tank 2, a water-sealing flame arrester 3, a wire mesh filter 4, a first pipeline flame arrester 5, a wet-type bleeding valve 6, a cyclone dehydrator 7, a second pipeline flame arrester 8, a proportioning mixer 9, a gas power machine 10, a first power generator 11, a waste heat boiler 12, a steam power machine 13, a second power generator 14, a condenser 15, a water storage tank 16, a pressurizing pump 17, a waste heat-type double-effect lithium bromide absorption water chiller/heater unit 18, and a gas-type double-effect lithium bromide absorption water chiller/heater unit 19;

the gas extraction pump station 1, the gas storage tank 2, the water-sealing flame arrester 3, the wire mesh filter 4, the first pipeline flame arrester 5, the wet-type bleeding valve 6 and the cyclone dehydrator 7 are sequentially connected;

the outlet of the cyclone dehydrator 7 is divided into two branches, one branch is sequentially connected with the second pipeline flame arrester 8, the proportioning mixer 9, the gas power machine 10, the waste heat boiler 12 and the waste heat-type double-effect lithium bromide absorption water chiller/heater unit 18, and the other branch is connected with the gas-type double-effect lithium bromide absorption water chiller/heater unit 19;

the first power generator 11 is connected with the gas power machine 10 and is driven by the gas power machine 10 to generate power, an outlet of the water storage tank 16 is connected with the pressurizing pump 17, the working substance (water) is pressurized by the pressurizing pump 17 and flows into the waste heat boiler 12, the high-pressure steam generated by the waste heat boiler 12 drives the steam power machine 13, and then the high-pressure steam is condensed by the condenser 15 and returns to the water storage tank 16, the condenser 15 is cooled by cooling water; and the second power generator 14 is connected with the steam power machine 13 and driven by the steam power machine 13 to generate power, and cold/hot water of the waste heat-type double-effect lithium bromide absorption water chiller/heater unit 18 and the gas-type double-effect lithium bromide absorption water chiller/heater unit 19 is delivered through an energy supply pipeline to users after being collected and mixed.

The pipeline section of the water-sealing flame arrester 3, the wire mesh filter 4, the first pipeline flame arrester 5, and the wet-type bleeding valve 6 has a parallel branch pipeline in the same configuration as it.

The gas power machine 10 is a mini-type gas turbine or internal combustion gas engine.

The steam power machine 13 is a steam turbine or steam screw expander.

An outlet of the cyclone dehydrator 7 is divided into two branches: one branch is sequentially connected with the second pipeline flame arrester 8, the proportioning mixer 9, the gas power machine 10, the waste heat boiler 12 and the waste heat-type double-effect lithium bromide absorption water chiller/heater unit 18; and the other branch is connected with the gas-type double-effect lithium bromide absorption water chiller/heater unit 19; the first power generator 11 is driven by the gas power machine 10 to generate power; an outlet of the water storage tank 16 is connected with the pressurizing pump 17, the working substance (water) is pressurized in the pressurizing pump 17 and then flows into the waste heat boiler 12, the generated high-pressure steam enters into the steam power machine 13 and does work there, and then the high-pressure steam is condensed by the condenser 15 and returns to the water storage tank 16; the second power generator 14 is driven by the steam power machine 13 to generate power; and cold/hot water of the waste heat-type double-effect lithium bromide absorption water chiller/heater unit 18 and the gas-type double-effect lithium bromide absorption water chiller/heater unit 19 is delivered through an energy supply pipeline to users after being collected and mixed.

A distributed CCHP energy system for gas extraction in coal mining areas is applicable to mining areas where the concentration of gas to be extracted is greater than or equal to 8%. In the distributed CCHP energy system for gas extraction in coal mining areas, the pipeline section of the water-sealing flame arrester 3, the wire mesh filter 4, the first pipeline flame arrester 5, and the wet-type bleeding valve 6 has a parallel branch pipeline in the same configuration as it. The gas power machine 10 is a mini-type gas turbine or internal combustion gas engine. The steam power machine 13 is a steam turbine or steam screw expander.

Since the gas extraction in coal mines is multi-protected by the water-sealing flame arrester 3, the wire mesh filter 4, the first pipeline flame arrester 5, and the wet-type bleeding valve 6, the safety of the gas conveying system is greatly improved; first, the extracted gas does work in the gas power machine 10; then, the high-temperature flue gas generated during combustion enters into the waste heat boiler 12 and waste heat-type double-effect lithium bromide absorption water chiller/heater unit 18 sequentially for energy exchange; in that way, the energy is utilized in a cascaded manner, and the utilization efficiency of the energy system is improved.

The invention claimed is:

1. A distributed combined cooling, heating and power energy system for gas extraction in a coal mining area, comprising:
   a gas extraction pump station, a gas storage tank, a water-sealing flame arrester, a wire mesh filter, a first pipeline flame arrester, a wet-type bleeding valve, a cyclone dehydrator, a second pipeline flame arrester, a proportioning mixer, a gas power machine, a first power generator, a waste heat boiler, a steam power machine, a second power generator, a condenser, a water storage tank, a pressurizing pump, a waste heat-type double-effect lithium bromide absorption water chiller/heater unit, and a gas-type double-effect lithium bromide absorption water chiller/heater unit;
   the gas extraction pump station, the gas storage tank, the water-sealing flame arrester, the wire mesh filter, the first pipeline flame arrester, the wet-type bleeding valve and the cyclone dehydrator are sequentially connected;
   an outlet of the cyclone dehydrator is divided into two branches, one branch is sequentially connected with the second pipeline flame arrester, the proportioning mixer, the gas power machine, the waste heat boiler and the waste heat-type double-effect lithium bromide absorption water chiller/heater unit, and the other branch is connected with the gas-type double-effect lithium bromide absorption water chiller/heater unit;
   the first power generator is connected with the gas power machine and is driven by the gas power machine to generate power, an outlet of the water storage tank is connected with the pressurizing pump, the working substance (water) is pressurized by the pressurizing pump and flows into the waste heat boiler, the high-pressure steam generated by the waste heat boiler drives the steam power machine, and then the high-pressure steam is condensed by the condenser and returns to the water storage tank, the condenser is cooled by cooling water;
   the second power generator is connected with the steam power machine and driven by the steam power machine to generate power, and cold/hot water of the waste heat-type double-effect lithium bromide absorption water chiller/heater unit and the gas-type double-effect lithium bromide absorption water chiller/heater unit is delivered through an energy supply pipeline to users after being collected and mixed.

2. The distributed combined cooling, heating and power energy system for gas extraction in a coal mining area according to claim 1, wherein, the pipeline section of the water-sealing flame arrester, the wire mesh filter, the first pipeline flame arrester, and the wet-type bleeding valve has a parallel branch pipeline in the same configuration as it.

3. The distributed combined cooling, heating and power energy system for gas extraction in a coal mining area according to claim 1, wherein, the gas power machine is a mini-type gas turbine or an internal combustion gas engine.

4. The distributed combined cooling, heating and power energy system for gas extraction in a coal mining area according to claim 1, wherein, the steam power machine is a steam turbine or a steam screw expander.

5. A distributed, combined cooling, heating, and power energy system comprising:
   a gas extraction pump station, a gas storage tank, a water-sealing flame arrester, a wire mesh filter, a first pipeline flame arrester, a wet-type bleeding valve, a cyclone dehydrator, a second pipeline flame arrester, a proportioning mixer, a gas power machine, a first power generator, a waste heat boiler, a steam power machine, a second power generator, a condenser, a water storage tank, a pressurizing pump, a waste heat-type double-effect lithium bromide absorption water chiller/heater unit, and a gas-type double-effect lithium bromide absorption water chiller/heater unit,
   wherein the gas extraction pump station, gas storage tank, water-sealing flame arrester, wire mesh filter, first pipeline flame arrester, wet-type bleeding valve, and cyclone dehydrator are sequentially connected;
   wherein an outlet of the cyclone dehydrator is divided into first and second branches, the first branch being sequentially connected with the second pipeline flame arrester, the proportioning mixer, the gas power machine, the waste heat boiler, and the waste heat-type double-effect lithium bromide absorption water chiller/heater unit, and the second branch being connected with the gas-type double-effect lithium bromide absorption water chiller/heater unit;
   wherein the first power generator is connected with the gas power machine and is driven thereby to generate power, an outlet of the water storage tank is connected with the pressurizing pump, water is pressurized by the pressurizing pump and flows into the waste heat boiler, high-pressure steam generated by the waste heat boiler drives the steam power machine, and then high-pressure steam is condensed by the condenser and returns to the water storage tank, the condenser being cooled by cooling water; and
   wherein the second power generator is connected with the steam power machine and driven thereby to generate power, and cold/hot water of the waste heat-type double-effect lithium bromide absorption water chiller/heater unit and the gas-type double-effect lithium bromide absorption water chiller/heater unit is delivered through an energy supply pipeline to users after being collected and mixed.

6. The distributed, combined cooling, heating, and power energy system of claim 5, wherein the pipeline section of the water-sealing flame arrester, the wire mesh filter, the first pipeline flame arrester, and the wet-type bleeding valve have a parallel branch pipeline in the same configuration as it.

7. The distributed, combined cooling, heating, and power energy system of claim 5, wherein the gas power machine is a mini-type gas turbine or an internal combustion gas engine.

8. The distributed, combined cooling, heating, and power energy system of claim 5, wherein the steam power machine is a steam turbine or a steam screw expander.

* * * * *